United States Patent [19]
Esch

[11] 3,858,033
[45] Dec. 31, 1974

[54] INCH-METRIC READ-OUT FOR A MEASURING SYSTEM

[75] Inventor: Robert E. Esch, Bloomfield Hills, Mich.

[73] Assignee: The Bendix Corporation, Southfield, Mich.

[22] Filed: Mar. 29, 1973

[21] Appl. No.: 345,912

[52] U.S. Cl..... 235/92 PL, 235/92 DN, 235/92 CC, 235/92 PE, 235/92 R, 328/48
[51] Int. Cl.................. H03k 21/06, H03k 21/36
[58] Field of Search....... 235/92 DN, 92 PL, 92 CC, 235/92 EV, 92 PE; 328/48, 44; 307/225, 222

[56] References Cited
UNITED STATES PATENTS
| | | | |
|---|---|---|---|
| 3,648,030 | 3/1972 | Shepherd et al. | 235/92 PE |
| 3,764,781 | 10/1973 | Kreithen et al. | 235/92 PE |

Primary Examiner—Gareth D. Shaw
Assistant Examiner—Joseph M. Thesz, Jr.
Attorney, Agent, or Firm—William S. Thompson

[57] ABSTRACT

A simplified arrangement for alternatively displaying in inch or metric numerical units the corresponding lineal value of a digital signal train generated by a measuring transducer. This arrangement includes a counter-display which will alternatively count and display in response to each digital signal in either of two incremental numerical values related by a factor of 25 $\times$ 10$^n$. The digital signal rate generation is set such that in counting and displaying in one of the incremental numerical values, the actual measured lineal distance corresponding to each digital signal corresponds to the numerical incremental value in metric units, so that in this mode the counter-display reads out metric (millimeters) directly. In the alternative mode, the digital signals generated are reduced by the ratio 25.0/25.4, eliminating one digital signal in every 63.5 signals generated by appropriate disclosed circuitry, and causing the main counter to count and display in the other incremental numerical value in response to each digital signal, thus resulting in an inch unit read-out.

2 Claims, 8 Drawing Figures

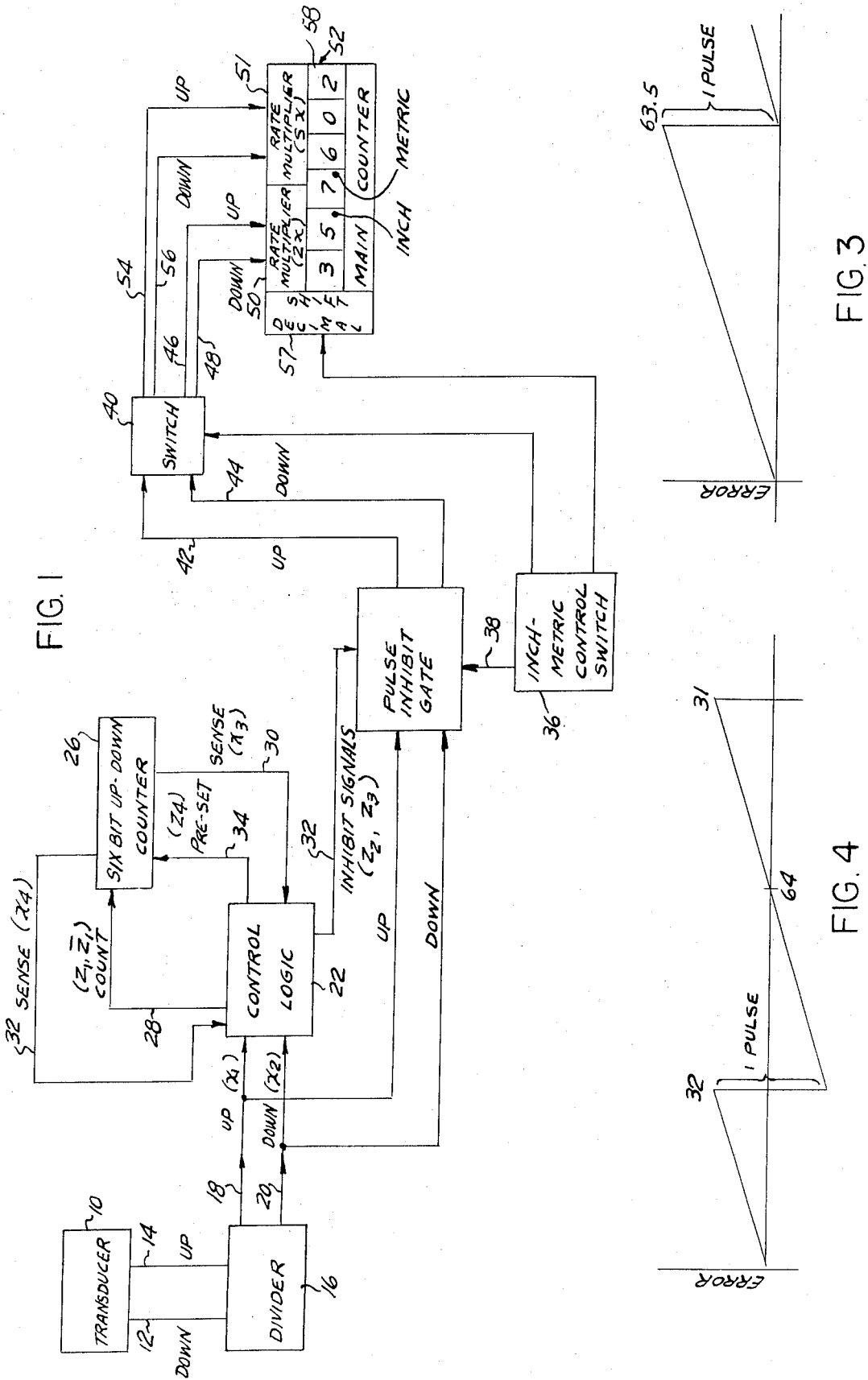

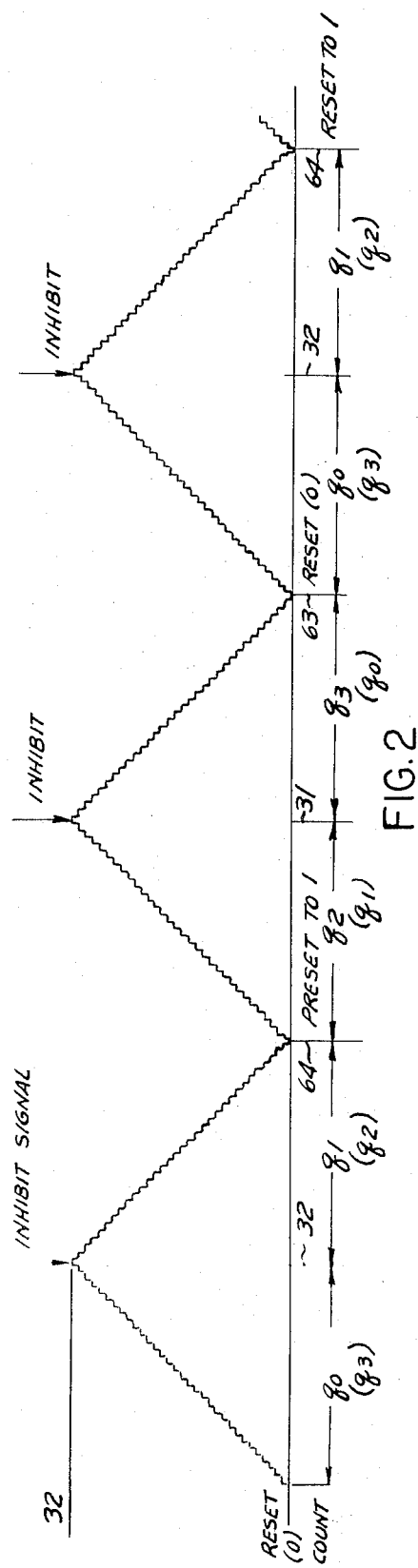

3,858,033

INCH-METRIC READ-OUT FOR A MEASURING SYSTEM

BACKGROUND OF THE INVENTION

1. Field Of The Invention

This invention concerns measuring systems and more particularly measuring systems utilizing digital signal generation counting and display.

2. Description Of The Prior Art

The impending metrication of the U.S. system of weights and measures as well as the growing internationalization of industry has led to the desirability of providing an English-metric capability for such apparatus as coordinate measuring machines, that is, the dimensions measured are capable of being displayed in inches or millimeters, for example.

Such a capability has in the past been provided by multiplying the pulses generated by the distance transducers by the appropriate conversion factor, i.e., 2.54 in converting inches to centimeters. This approach has the disadvantage of requiring rather complex circuitry including several counters, since the conversion does not comprise an even integral multiplication of the digital signal. For example, in the typical inch to metric conversion described in U.S. Pat. No. 3,571,575 each of the digital pulses indicative of inches is first multiplied by two. After four of such pulses are counted in an auxiliary (and in the main) counter, an additional pulse is added, and after 50 are counted of such pulses yet another additional pulse is added. The system is relatively complex, and leads to a "stutter-step" progression in the main counter and display of the least significant digits, since the adding in process inherently produces an uneven response to the digital signals depending on the prior count, i.e., the main counter may advance by two, three, or four counts in response to a single digital signal. This uneven progression makes readings less convenient and may contribute to operator errors.

While a conversion system employing pulse suppression rather than multiplication has been described, such a system has not heretofore been employed in a unit conversion system, i.e., inch to metric, but only in systems causing a pulse count generated by a transducer to exactly correspond to one or the other unit systems, as evidenced by the aforementioned U.S. Pat. No. 3,571,575 which utilizes a pulse suppression system to cause a wavelength pulse count to correspond exactly to units in either inches or to metric, but in converting either the inch or metric to each other, the classic 2.54 conversion is utilized.

Accordingly, it is an object of the present invention to provide a greatly simplified conversion arrangement for such systems which produces an even progression of displayed values in response to the digital signals in both units.

It is a further object of this invention to produce such a conversion with a minimum conversion error.

SUMMARY OF THE INVENTION

These and other objects of the present invention which will become apparent upon a reading of the following specification and claims are accomplished by providing a main counter and display arrangement which counts and displays in response to each digital signal in alternative different incremental numerical values related by a given factor, and by setting the digital generation rate such that one incremental numerical value is equal to the actual value, measured in one of the units by each digital signal generated, so that in one mode the main counter and display will read out in the one units.

In the other units, the generated digital signals are reduced at a rate equal to the ratio of the given factor over the conversion factor so that counting and displaying of the reduced generation rate digital signals in the main counter in the other incremental numerical value yields a read-out in the other units.

By selecting the given factor value close to the conversion factor, very few signals need be suppressed, and by suppressing the digital signal at mid-interval rather than at end-interval, the maximum conversion error is minimized.

DESCRIPTION OF THE DRAWING

FIG. 1 is a block diagram of a system according to the present invention.

FIG. 2 is a diagrammatic representation of the generation of the count inhibit control signal.

FIG. 3 is a diagrammatic representation of the conversion error created by correction at the end interval point of the correction interval.

FIG. 4 is a diagrammatic representation of the conversion error created by correction at the mid-interval point of the correction interval.

FIG. 8 is a corresponding state table for the logic network depicted in FIGS. 5-7.

DETAILED DESCRIPTION

Figure 5:
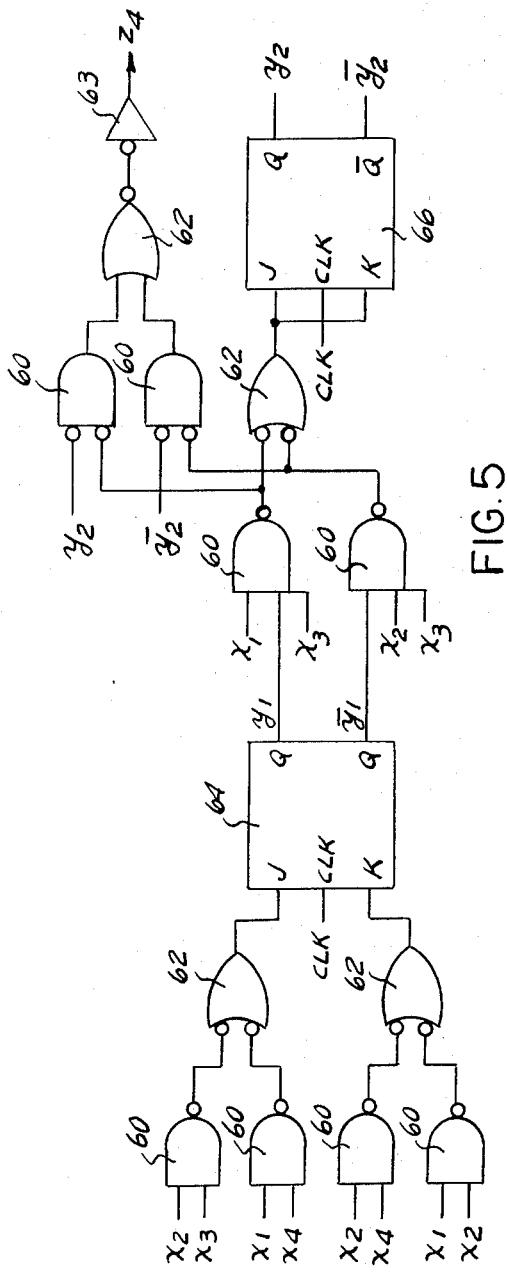
FIGS. 5, 6, and 7 show a representative logic network to provide the control functions designated by the control logic block in FIG. 1.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

In measuring systems of the type with which the present invention is useful, a transducer is provided which generates a train of digital signals (pulses) corresponding to the parameter (distance) measured, that is, the total number of signals generated corresponds to the total parameter quantity (distance) measured. A typical transducer principle is the well known Moire' fringe grating which produces light and dark patterns which shift in exact correspondence to relative movement between a fixed grating and a moveable grating. The shift of these patterns is read by photodetectors and ultimately a train of electrical pulses is generated therefrom which corresponds to this relative movement.

In order to provide a read-out of the measured distance, these pulses are counted in a main counter, and the total count displayed in numerical decimal form. Inasmuch as much of the advantage of these types of machines lies in the relative ease of making measurements by an operator, it is of course desirable that this displayed numerical count indicate a reading in some units, i.e., inches. This can most easily be arranged by proper selection of the grating, as the spacings thereof control the number of light and dark patterns produced by a given extent of relative movement, so that one digital signal corresponds to some even unit increment, i.e., one pulse is produced for every 0.0001 inch of relative movement. Thus, the main counter can merely count and display the pulses to obtain the desired direct read-out.

The problems described above arise in attempting to provide such a direct read-out in units of two differing, i.e., inch or metric, unit systems in response to a fixed transducer signal generation rate.

In converting inches to metric, the conversion factor as noted above is $2.54 \times 10^n$, the $10^n$ factor depending on which metric unit is used, i.e., in converting inches to centimeters, the inch value is multiplied by 2.54 or in converting inches to millimeters, the inch value is multiplied by 25.4.

In the prior art approaches, the pulse train produced from this selected grating would be multiplied by the $2.54 \times 10^n$ factor to produce a metric conversion, but each digital signal produces a differing count change in the main counter depending on the previous count, leading to the afore-mentioned difficulties.

Consider the effect, however, if the main counter can be selectively caused to count and display in two different incremental numerical values in response to each digital signal in different read-out modes, i.e., 0.0002 and $0.0050 \times 10^n$, for example. These incremental values are related by a factor of $25. \times 10^n$, that is, 0.0002 multiplied by 25 equals 0.0050.

Consider further that if the rate of digital signal generation is selected such that the actual lineal distance producing a single digital signal equals in one of the units one of these incremental numerical values, i.e., if one pulse is produced for every 0.0050 millimeters, a direct read-out in millimeter units is produced.

It can be seen that if the number of digital signals so produced are reduced by a proportion equal to the given incremental numerical value factor divided by the unit conversion factor, a read-out in the other of the units can be simply obtained if the main counter counts and displays in response to each digital signal in the other of the incremental numerical values.

The advantage of this approach can be seen by taking the values of the example given, that is, if each digital signal produced corresponds to 0.0050 millimeters, then reducing the number of digital signals produced for any given reading by a factor of 25.0/25.4 land reading out in 0.0002 increments for each signal will give a correct read-out in inches. Since the proportion of signals eliminated is $25.4 - 25.0/25.4 = 0.4/25.4$, or equals one in every 63.5 signals, this suppression can be rather simply and easily accomplished, and the progression in either units is even, that is, the main counter will always increment by the same amount. Furthermore, the maximum conversion error corresponds to 1 pulse or the resolution of the system, and if by means of circuitry hereinafter described, if the suppression begins at mid-interval, i.e., the 32nd count, 95th, 158th, etc., rather than at the end of the interval i.e., the 63rd, 127th, 190th, etc., the maaximum error will be one-half the resolution value (1 pulse).

Such a system is represented in block diagram form in FIG. 1. A transducer 10 such as a Moire' fringe grating system produces trains of digital signals, i.e., pulses, corresponding to movement of a measuring probe (not shown) at either of two outputs 12 and 14, one corresponding to movement in one direction (down) and the other corresponding to movement in the other (up) direction. Typically this pulse train is "divided" electronically by some integral value to improve the resolution by suitable well known divider circuitry represented by block 16, so that the number of signals produced for a given amount of travel in either direction is multiplied by the integral value. Taken together the transducer 10 and the divider circuitry 16 comprise digital signal generation means generating a train of digital signals corresponding to a measured parameter (i.e., distance in a given direction).

In a preferred embodiment a 50 line per millimeter grating was used together with a divide by four divider circuitry, so that 200 digital signals per millimeter are generated on output lines 18 and 20.

Output lines 18 and 20 are connected into a control logic network 22 as well as a pulse inhibit gate 24 which controls the transmission of pulses therethrough in a manner to be described.

Control logic 22 receives the pulses transmitted via output lines 18 and 20 and for each pulse received, a count signal is transmitted via line 28 to a six bit up-down counter 26. Up-down counter 26 is adapted to count up to capacity (32) and then count down to zero with continuing counts of the same sign. This is represented graphically in FIG. 2, in which one up-down cycle will occur with 64 counts of the same sign.

Since the function of the up-down counter 26 is to provide a sensing of the generation of predetermined numbers of pulses in one or the other direction, it will of course be necessary to generate a sign signal which is reflective of the direction corresponding to the pulse and the count state in the counter. Thus, if an "up" pulse count less than 32 is contained in the up-down counter 32 and an additional "up" pulse is received, a sign signal calling for a count "up" will be transmitted with the "count" signal. If the up-down counter has reached capacity in response to the "up" pulses (as indicated by a 0.32 sense signal transmitted via line 30) additional pulses in the "up" sense cause the counter to count down, by means of an appropriate sign signal generated over line 28.

Down pulses received in the interim are caused to produce a reverse counting by a reversal of the sign signal generated.

The converse occurs with a "down" count contained in the up-down counter 26.

The purpose of the up-down counter 26 and the control logic 22 is to produce an inhibit signal on line 32 suppressing the next pulse produced on lines 18 and 20 whenever it is present, with the net effect being to eliminate one pulse in every 63.5 produced in either direction.

For this reason, an inhibit signal is generated whenever a 32 count is reached in the up-down 26, and by producing a preset signal over line 34 count to one every other time the up-down counter reaches zero, as depicted graphically in FIG. 2. From this it can be appreciated that an inhibit signal will be generated at the 32nd count, the 95th, the 159th, and so on, which in effect an inhibit signal every 63.5 pulses counted. By selecting the correction point at mid-interval, at which the maximum error equals one-half pulse, it is appreciated that this maximum error equals one-half the resolution (one pulse).

This last point is depicted graphically in FIGS. 3 and 4 which represent corrections by one pulse at end-interval and mid-interval respectively. The correction as in FIG. 3 results in an error of one pulse, as the full error is allowed to accumulate before correction, while in FIG. 4 only one half pulse error has accumulated at the correction point, with the "negative" error introduced by the correction still being equal or less than one half pulse error.

Thus, an inhibit signal is generated on line 32 at successive alternate intervals of 63 and 64 pulses equivalent to every 63.5 consecutive pulses generated either on lines 18 or 20, which signal is transmitted to the pulse inhibit gate 24.

The pulse inhibit gate 24 allows pulses received on lines 18 or 20 to be transmitted therethrough if a pulse inhibit signal is not present on line 32 and on line 36 from an inch-metric control switch 38. The control switch 38 produces a control signal when in the inch mode, but not in the metric mode.

Thus, if an inhibit signal has been generated on line 32, and the control switch 36 is set in the inch mode, the next pulse received in the same direction (up or down) is blocked. If both conditions do not exist, all pulses received are transmitted through the pulse inhibit gate 24.

Accordingly, it can be appreciated that control logic 22, the updown counter 26, the pulse inhibit gate 24 and the inch-metric control switch 36 together comprise digital signal transmission control means selectively allowing all of the digital signals in the digital signal train generated by the digital signal generation means to be transmitted therethrough or alternatively suppressing digital signals in the digital signal train at a rate equal to the ratio of the differing numerical increments divided by the unit conversion factor (i.e., one signal in every 63.5) while allowing transmission of the remainder of the digital signals.

Pulses allowed to pass through the pulse inhibit gate 36 are directed to a diverter switch 40 via lines 42 and 44.

Diverter switch 40 is controlled by the inch-metric control switch 36 (as by a mechanical connection) so that in the inch mode the pulses are routed over lines 46 and 48 to a 2X rate multiplier 50 associated with the main counter and display 52, while in the metric mode the signal pulses are routed via lines 54 and 56 to a 5X rate multiplier 51 associated with the main counter and display 52.

The inch-metric control switch 36 also causes a shift of the decimal point in the display 58 of the main counter and display 52 one place to the left as indicated when in the inch mode by the decimal shifter 57.

Accordingly, each pulse received in the inch mode results in a two count change in count displayed by the display 58, while in the metric mode each pulse received results in a 50 count change in the count displayed by display 58.

Thus, in the inch mode the least significant digit displayed by the main counter and display 52 increments in numerical values of 0.0002, while in the metric mode, the main counter and display 52 increments in numerical values of 0.0050.

It can thus be appreciated that taken together the inch to metric switch 36, the diverter switch 40, the rate multipliers 50 and 51, the decimal shifter 57 and the main counter and display 52 comprise a counter and display means which is responsive to each digital signal generated by the digital signal generation means described above to count and numerically display in differing (i.e., 0.0050 or 0.0002) alternative numerical increment values selectively.

Since each pulse is generated in response to movement of $1/50 \times 1/4$ mm $= 1/200$ mm $= 5/1,000$ mm, it can be seen that by counting in the 0.0050 count increments, a metric read-out is produced in millimeter units.

In the inch mode, after suppression of one pulse in every 63.5, each pulse represents 0.0002 inches, so taht the correct decimal read-out is also attained by merely counting and displaying in the 0.0002 increments.

It can be appreciated that by counting and displaying in numerical increments related by a factor of $2.5 \times 10^n$ (50/2), the major portion of the conversion process is accounted for, with remaining $0.04 \times 10^n$ factor accounted for by relatively simple means.

It can also be appreciated that in the particular values selected for this embodiment, a very convenient least significant digit read-out values in each unit system are produced, 0.0002 inches and 0.005 mm. Further, the progression in both units is even, i.e., 0.0002, 0.0004, 0.0006, etc., in inches, 0.005, 0.010, 0.015 in millimeters without the stutter step response to the digital signals.

While this system has been described in specific reference to an inch to millimeter conversion, and in reference to 0.0050 millimeter and 0.0002 resolution linear measuring systems, and while this particular embodiment produces a very useful system for devices of the sort described, it should be appreciated that by utilizing the principle of the present invention other conversions are possible: (a) other decimal orders of magnitude, i.e., inches to centimeters; (b) other units i.e., meters to yards; (c) conversions between the same or differing unit systems i.e., feet to yards; (d) other parameters i.e., volume; (e) other applications than measuring systems.

Also, other means for carrying out the functions described are of course possible, such as special counter arrangements for causing the incrementing in differing numerical units rather than the rate multipliers and decimal shift.

Figure 7:
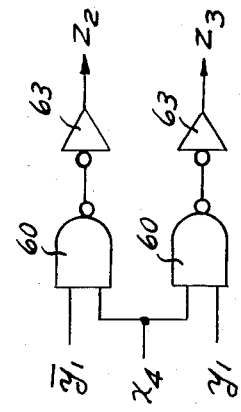
Figure 6:
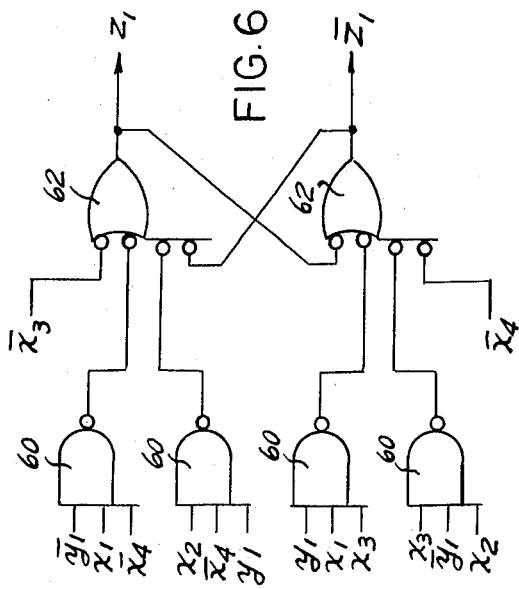

Referring to FIGS. 5–7, a representative logic network is depicted for generating the various control signals from the system conditions referred to in describing the basic arrangement shown in FIG. 1.

The following table indicates the $x$ and $Z$ term assigned to each condition and control signal respectively as used in FIGS. 5–8 and which are also shown on FIG. 1:

$x_1$ — Up Pulse
$x_2$ — Down Pulse
$x_3$ — Counter 26 at Zero
$x_4$ — Counter 26 at 32
$Z_1$ — Count next Pulse Up ($Z_1 = 1$)
$\bar{Z}_1$ — Count next Pulse Down ($Z_1 = 0$)
$Z_2$ — Inhibit Next Pulse if up
$Z_3$ — Inhibit Next Pulse if down
$Z_4$ — Preset Counter to One As can be seen this system consists of interconnected groups of AND gates 60, OR gates 62, and inverters 63, as well as a pair of JK flip-flops 64 and 66. The various system condition signals $x_1$, $x_2$, $x_3$ and $x_4$ are combined in this logic network as shown to produce the various control signals $Z_1$, $\bar{Z}_1$, $\bar{Z}_2$, $Z_3$, and $Z_4$, which combination will satisfy the requirements as set forth in describing the basic system.

From the above description of the operation of this system, it is apparent that the direction of counting of the up-down counter and that the generation of the various control signals in response to the up or down pulses depends both on the count contained in the up-down counter and on the previous history of counting prior to receiving the up or down pulses. For example, the up-down counter 26 should count up or count down in response to either an up or down pulse depending on the nature of the count contained in the up-down counter 26, that is, if the up-down counter has been counting up "up" pulses and a down pulse is received, the up-down counter 26 then should count down one pulse. On the other hand, if the up-down counter 26 has been counting back down from 32 in response to "up" pulses and a down pulse is received, the up-down counter 26 should be caused to count up one count.

The generation of an inhibit ($Z_2$, $Z_3$) signal is similarly dependent on the previous history of the count, since pulses are eliminated upon continued generation in a given direction at the prescribed interval; for example, if the counter has been counting "up" pulses and reaches the 32 count and passes through, counting down to 31 and a down pulse is received the counter will "back up" to 32. Since this reattainment of a 32 count in the counter does not reflect an appropriate point to suppress another pulse in either direction, the logic network must account for this situation and not produce an inhibit signal.

These factors are accounted for in the logic network shown in FIGS. 5-7 by the two JK flip flops 64 and 66 in which the states of the two outputs $y_1$, $\bar{y}_1$, $y_2$ and $\bar{y}_2$ is controlled by both the JK inputs and the previous state of the flip flops, as is well known in the art. Thus, this network can be in four different states at any given time as follows:

$$y_1\ y_2$$

$$\bar{y}_1\ y_2$$

$$y_1\ \bar{y}_2$$

$$\bar{y}_1\ \bar{y}_2$$

All of the theoretical control logic states of $q_0 - q_3$ and $x_1 - x_4$ are summarized in the table of FIG. 8. In this table each system state is represented by one of the symbols $q_0$, $q_1$, $q_2$, $q_3$, i.e., $y_1 - y_2$ is represented by the symbol $q_0$.

The symbols $q_0 - q_3$ opposite each horizontal row of blocks represents the initial state of the system, while the symbol $q_0 - q_3$ within each block represents the desired state after receiving $x$ signals set out above each vertical row of blocks.

Referring to FIG. 2, these states are related to the count contained in the up-down counter as shown, the $q_0 - q_3$ letters shown non-parenthetically reflecting the progression of states for an "up" count and parenthetically for a "down" count progression. Thus, for a complete 127 count cycle, if the count is "up," states $q_0$, $q_1$, $q_2$ and $q_3$ successively occur, while for a "down" count the opposite progression of $q_3$, $q_2$, $q_1$, and $q_0$ occurs.

The symbol sets of $x$, 0, 1 in each block represent the desired control signals $Z_1$, $Z_2$, $Z_3$ and $Z_4$ generated from each of the system condition signal combinations ($x_1 - x_4$) when the system is in each of the states $q_0 - q_4$. The symbol $x$ indicates a "don't care" condition for the Z signal since the corresponding x signals combinations either cannot occur (i.e., counter at zero and at 32, or an up and down pulse occurs at the same time) or, in the first column, render the particular Z control signal irrelevant (i.e., if neither an up or down pulse is present and the counter is not at zero or 32, the instruction to the counter to enable counting up or down cannot be made until the nature of the next pulse is known, i.e., up or down). The symbol 0 is used to represent the control signal $\bar{Z}_1$ and also the desired absence of the particular control signal Z in the case of $Z_2$, $Z_3$, $Z_4$, while the symbol 1 represents the presence of the particular control signal $Z_1 - Z_4$.

Taking as an example the first block in the third vertical row of blocks, the $x$ states are represented by 0011, that is, no up or down pulse is present (represented by the first two digits 0, 0) but the counter is represented at both zero and 32 (represented by the third and fourth digits 1, 1). Since this cannot occur, all of the Z signals are "don't care" or $x$.

Taking $q_0$ as the initial start up condition with a zero count, if the first pulse is an up pulse as indicated by the $x$ condition 1000 (ninth vertical row) the state $q_0$ is maintained as indicated and a count up is initiated as indicated by the Z signal 1000. Thus, further up pulses are counted up as indicated in FIG. 2. Down pulses in the $q_0$ state and the counter not at zero or 32 ($x = 0100$) cause counting down of the count (see the fifth vertical row). Upon attainment of a 32 count ($x$ condition 1001), the state is shifted to $q_1$ and the $Z_2$ inhibit signal is generated which will cause inhibiting of the next pulse if up.

In the $q_1$ state, further up pulses will cause the counter to count down (as shown in FIG. 2) while maintaining the $q_1$ state (see $x$ conditions 1000 and 1001) while down pulses will cause a count up as indicated. If sufficient up pulses are received, a zero count will be reached. At this point, if a further up pulse is received ($x$ condition 1010), the count up enablement signal is generated ($Z_1 = 1$) and the preset counter signal $Z_3$ is produced, and the state is shifted to $q_2$, all as indicated in FIG. 2.

In the $q_2$ state, further up pulses cause counting up due to the generation of the $Z_1 = 1$ signal while down pulses (in the $q_2$ state) cause a counting down ($Z_1 = 0$, $x = 0100$, $q_2$ state). Upon attainment of a 32 count ($x = 1001$) in the $q_2$ state the inhibit up signal $Z_2$ is produced ($Z = 0100$) and the state is shifted to $q_3$ as indicated.

In the $q_3$ state, the counter counts down in response to up pulses ($Z_1 = 0$) and up in response to down signals ($Z_1 = 1$) until a zero count is reached. A zero count reached in $q_3$ state does not produce the preset $Z_2$ signal as shown, but causes a shift to an up count mode ($Z_1 = 1$) and a shift to state $q_0$ to prepare for another cycle.

If in the initial $q_0$ state, the first pulse is a down pulse ($x = 0110$), it can be seen that a count up signal is also generated ($Z_1 = 1$) but in addition the state is shifted to $q_3$. In the $q_3$ state, further down pulses cause a count up and up pulses cause a count down.

A progression through states $q_2$, $q_1$, $q_0$ similarly produces the inhibiting and presetting signals in response to progressive counts of down pulses as indicated in FIG. 2.

Thus, the states $q_0 - q_3$ set by the JK flip-flops 64, 66 determine the response of the system to the various events so that the functions described above are carried out properly.

I claim:

1. A measuring system for selectively displaying measured distances in inch or Metric unit systems comprising:

counter and display means responsive to each digital signal received to count and numerically display alternatively in numerical increment values of 0.0050 or 0.0002 selectively;

digital signal generation means generating a train of digital signals corresponding to measured distances in a given direction, the generation rate of said signals relative to said measured distances being such that the distance corresponding to the generation of one digital signal equalsl 0.0050 millimeters;

digital signal transmission control means selectively allowing all of said digital signals in said digital signal train generated by said digital signal generation means to be transmitted to said counter and display means or alternatively suppressing one digital signal at successive alternate intervals of 63 and 64 digital signal counts in said train equivalent to said rate of one signal in 63.5 signals;

whereby said counter and display means counts and displays in millimeters in response to said digital signals whenever said digital signal train is transmitted unchanged by said digital signal transmission control means and said counter and display means counts and displays in inch values whenever said digital signals are suppressed by said digital signal transmission control means and said counter and display means counts and displays in said numerical increment value of 0.0002.

2. The system of claim 1 wherein said suppression begins with the suppression of the 32nd digital signal generated and said suppression continues at alternate intervals of 63 and 64 signal counts.

* * * * *